United States Patent [19]
Cordova et al.

[11] Patent Number: 5,546,482
[45] Date of Patent: Aug. 13, 1996

[54] POTTED FIBER OPTIC GYRO SENSOR COIL FOR STRINGENT VIBRATION AND THERMAL ENVIROMENTS

[75] Inventors: Amado Cordova; Glenn M. Surabian, both of West Hills, Calif.

[73] Assignee: Litton Systems, Inc., Woodland Hills, Calif.

[21] Appl. No.: 266,993

[22] Filed: Jun. 27, 1994

Related U.S. Application Data

[63] Continuation of Ser. No. 47,297, Apr. 19, 1993, abandoned.

[51] Int. Cl.[6] .................................................. G02B 6/04
[52] U.S. Cl. ........................... 385/12; 242/173; 356/350; 385/100
[58] Field of Search ..................................... 156/169, 173, 156/425; 242/172, 173, 159; 356/350; 385/12, 13, 100, 114, 115, 121, 134, 147, 85

[56] References Cited

U.S. PATENT DOCUMENTS

| | | | |
|---|---|---|---|
| 4,699,451 | 10/1987 | Mohr | 356/350 |
| 4,834,493 | 5/1989 | Cahill et al. | 385/85 |
| 5,095,514 | 3/1992 | Curtis | 385/12 |
| 5,168,539 | 12/1992 | Negishi et al. | 356/350 |
| 5,245,687 | 9/1993 | Usui | 385/134 |

FOREIGN PATENT DOCUMENTS

| | | |
|---|---|---|
| 0391557 | 10/1990 | European Pat. Off. . |
| 4057814 | 2/1992 | Japan . |
| 2146428 | 4/1985 | United Kingdom . |
| 9005929 | 5/1990 | WIPO . |

*Primary Examiner*—John Ngo
*Attorney, Agent, or Firm*—Elliott N. Kramsky

[57] ABSTRACT

A sensor coil for a fiber optic gyroscope is potted in polymer-based material selected for avoiding such temperature-related anomalies as bias spikes and bias crossings. The potting material is based upon a silicone composition characterized by a glass transition temperature that lies below and outside the operational range required for commercial or military operation. Predetermined fillers may be added to the silicone for bolstering stiffness (Young's modulus) within the polymer's rubbery region to reduce the gyro's bias sensitivity to vibration. Excellent bias thermal and vibration performance has been achieved with coils potted in silicone adhesive with a carbon-black filler.

3 Claims, 7 Drawing Sheets

POTTED FIBER OPTIC GYRO SENSOR COIL FOR STRINGENT VIBRATION AND THERMAL ENVIROMENTS

This application is a continuation of application Ser. No. 08/047,297, filed Apr. 19, 1993, now abandoned.

BACKGROUND

1. Field of the Invention

The present invention relates to fiber optic gyroscopes. More particularly, this invention pertains to a potted sensor coil design for use in high vibration environments, and in rapidly-changing temperature environments.

2. Description of the Prior Art

An interferometric fiber optic gyroscope comprises the following main components: (1) a light source, (2) two beamsplitters (fiber optic directional coupler and/or integrated-optics Y-junctions) to satisfy the requirement of a "minimum reciprocal configuration" (S. Ezekiel and M. J. Arditty, Fiber Optic Rotation Sensors New York, Springer-Verlag p. 2–26 1982), (3) a fiber optic sensing coil made of either polarization maintaining (PM) fiber or made of low-birefringence (standard telecommunications) fiber, (4) a polarizer (and sometimes one or more depolarizers), and (5) a detector. Light from the light source is split by the loop beamsplitter into copropagating and counterpropagating waves travelling in the sensing coil. The associated electronics measures the phase relationship between the two interfering, counter-propagating beams of light that emerge from opposite ends of the coil. The difference between the phase shifts experienced by the two beams is proportional to the rate of rotation of the platform to which the instrument is fixed, due to the well-known Sagnac effect.

Environmental factors can affect the measured phase shift difference between the counterpropagating beams, thereby introducing a bias error. Such environmental factors include variables such as temperature, vibration (acoustical and mechanical) and magnetic fields. In general, such factors are both time-varying and unevenly distributed throughout the coil. These environmental factors induce variations in the optical light path that each counterpropagating wave encounters as it travels through the coil. The phase shifts induced upon the two waves are unequal, producing a net undesirable phase shift which is indistinguishable from the rotation-induced signal.

One approach to attain a reduction of sensitivities arising from environmental factors has involved the use of various symmetric coil winding configurations. In such coils, the windings are arranged so that the geometrical center of the coil is located at the innermost layer while the two ends of the coil are located at the outermost layers.

N. Frigo has proposed the use of particular winding patterns to compensate for non-reciprocities "Compensation of Linear Sources of Non-Reciprocity in Sagnac Interferometers". *Fiber Optics and Laser Sensors I*, Proc. SPIE Vol. 412 p. 268 (1983). Furthermore, U.S. Pat. No. 4,793,708 of Bednarz entitled "Fiber Optic Sensing Coil" teaches a symmetric fiber optic sensing coil formed by dualpole or quadrupole winding. The coils described in that patent exhibit enhanced performance over the conventional helix-type winding.

U.S. Pat. No. 4,856,900 of Ivancevic entitled "Quadrupole-Wound Fiber Optic Sensing Coil and Method of Manufacture Thereof" teaches an improved quadrupole-wound coil in which fiber pinching and microbends due to the presence of pop-up fiber segments adjacent the end flanges are overcome by replacing such pop-up segments with concentrically-wound walls of turns for climbing between connecting layers. Both of the aforementioned United States patents are the property of the assignee herein.

While appropriate coil winding techniques minimize some of the bias errors found in the output of a fiber optic gyro, they are not capable of eliminating all of such biases. In particular, the design of the gyro sensor coil can impact the gyro's random walk, bias stability, bias temperature sensitivity, bias temperature-ramp sensitivity, bias vibration sensitivity, bias magnetic sensitivity, scale factor temperature sensitivity, scale factor linearity and input axis temperature sensitivity.

It is recognized that potting the windings of a sensor coil within a matrix of adhesive material is advantageous as it facilitates the precision of coil winding. Furthermore, it was disclosed in pending U.S. Pat. application 07/938,294 of co-inventors Amado Cordova, Donald J. Bilinski, Samuel N. Fersht, Glenn M. Surabian, John D. Wilde and Paul A. Hinman entitled "Sensor Coil For Low Bias Fiber Optic Gyroscope", now U.S. Pat. No. 5,321,593 that the composition of the potting material can have a significant impact upon the bias vibration sensitivity of the fiber optic gyro due to a non-reciprocal phase shift between the light waves counterpropagating within the coil as a result of changes in fiber length and refractive index brought about by vibration dynamic strains.

The referenced United States patent application discloses a sensor coil whose design incorporates a number of features for minimizing the aforesaid environmental factors. Among the issues identified and addressed in that patent application is the relationship between the modulus of elasticity of the potting material composition of an encapsulated sensor coil and vibration-induced bias..

Generally, it is disclosed in that application that gyro performance in terms of vibration-induced bias is significantly improved by the use of potting material possessing a high modulus, of elasticity or Young's modulus although not so high as to produce other problems related to gyro operation at temperatures significantly removed from the curing temperature of the potting material such as temperature related coil cracking, h-parameter (polarization cross-coupling) degradation if the coil is of PM-fiber composition, and large bias temperature-ramp sensitivity. Polymers are attractive candidates for the adhesive potting material due to such common properties as substantial impermeability to moisture and the like. Sensor coils have been fabricated of polymers that incorporate the teachings of the referenced patent application. For example, coils encapsulated in the UV-curable acrylate-adhesive marketed under the trademark "NORLAND 65" have demonstrated adequate vibration bias characteristics. However, when cycled through a temperature range that includes the gyro's operational range, such coils have exhibited some disturbing, temperature-related anomalies. These include so-called "bias spiking" and "bias crossing". Each of such phenomena can significantly hamper the successful operation of the gyro. A bias spike may be of sufficient magnitude to take a gyro out of specifications while bias crossing can effectively render the ability to model out the bias error impossible or impractical.

SUMMARY OF THE INVENTION

The foregoing and additional shortcomings and disadvantages of the prior art are addressed by the present invention that provides a sensor coil for a fiber optic gyroscope. Such a coil includes optical fiber. The fiber is arranged into a plurality of concentric cylindrical layers. Each of the layers comprises a plurality of turns of the fiber and each of the turns is arranged in a predetermined winding pattern. The turns are encapsulated with potting material whose glass transition temperature lies outside the gyro's operating range.

The preceding and other features and advantages of the invention will become further apparent from the detailed description that follows. Such description is accompanied by a set of drawing figures. Numerals of the drawing figures, corresponding to those of the written text, point to the various features of this invention with like numerals referring to like features throughout.

DETAILED DESCRIPTION

Figure 1:
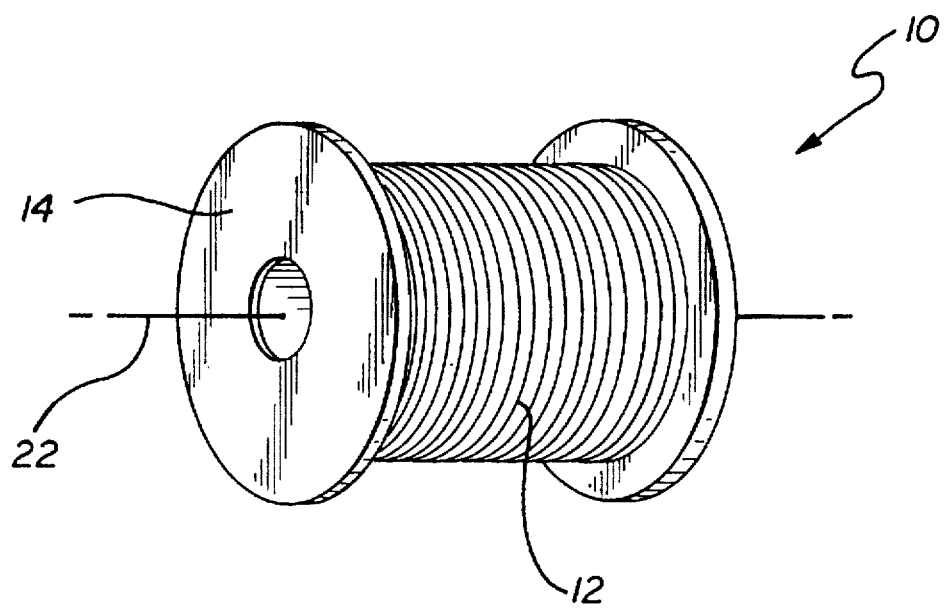
FIG. 1 is a perspective view of a sensor coil for a fiber optic gyroscope in accordance with the invention.

Turning to the drawings, FIG. 1 is a perspective view of a sensor coil 10 in accordance with the present invention. As mentioned earlier, the sensor coil 10 provides a critical element of a fiber optic gyro system. In use, it is rigidly fixed to a platform whose rotation rate is to be measured.

The sensor coil 10 comprises an optical fiber 12 that is wound upon a supportive spool 14 and serves as an optical guide for receiving a counterpropagating beam pair emitted from a common light source (not shown). The supportive spool 12 of FIG. 1 includes end flanges, the presence or absence of which forms no part of the claimed invention.

The spool 14 is preferably of carbon composite composition, or of another material of similar thermomechanical properties (in particular, a stiff material with a low coefficient of thermal expansion), as disclosed in pending U.S. patent application 07/938,294, including woven carbon fibers such as those commercially available from such sources as the Amoco Corporation under the trademarks "P-25", "P-55" or "P-105". The spool 14 is . formed of fibers that have been built up into multiple fiber layer tubes or sheets by means of a bonding matrix of, for example, phenolic material. The spool 14 can be formed from such tubes or sheets by a number of known processes including, for example, cutting sections therefrom. Alternatively, the woven fiber can be arranged into predetermined orientations and shapes in a dye and the bonding material cast around it. Another process employs transfer molding in which the chopped fiber is mixed with a transfer molding material and then transferred or pressure injected into a transfer mold. The fibers are preferably oriented at right angles within the bonding matrix material, aligned both longitudinally and circumferentially with respect to the spool's axis of rotation 22. By so arranging the fibers, the spool 14 will expand symmetrically both longitudinally and radially with temperature.

As disclosed in the referenced patent application, a theoretical model of bias non-reciprocities in a fiber optic gyroscope developed by the inventors discloses that gyro bias errors under a dynamic thermal environment can be due to thermal stress. This effect is similar to the standard temperature Shupe effect reported in "Thermally Induced Non-Reciprocity in the Fiber Optic Interferometer" D M. Shupe, *Applied Optics*, Vol 19, p. 654 (1980). The use of a carbon composite-based spool 14 addresses one of such sources of bias, the thermal mismatch that exists between a glass optical fiber and a conventional metallic spool. Another driver of thermal stress-induced bias error is thermal stress due to expansion/contraction of the coil potting material (discussed below). The differences between the standard temperature-Shupe effect and the thermal-stress induced Shupe effect are clearly noticeable when a coil is subjected to a steady-state temperature ramp. While the bias error due to the standard Shupe effect dies away as soon as the temperature gradients become constant with time, the bias error due to the thermal-stress effect is non-zero as long as the temperature of the coil is changing and that effect remains even after the temperature gradients have reached steady-state. Contrasting the effects, the standard Shupe effect is mainly a function of the rate of change of the temperature gradients across the coil while the thermal-stress induced Shupe effect is mainly a function of the rate of change of the coil average temperature.

Figure 2:
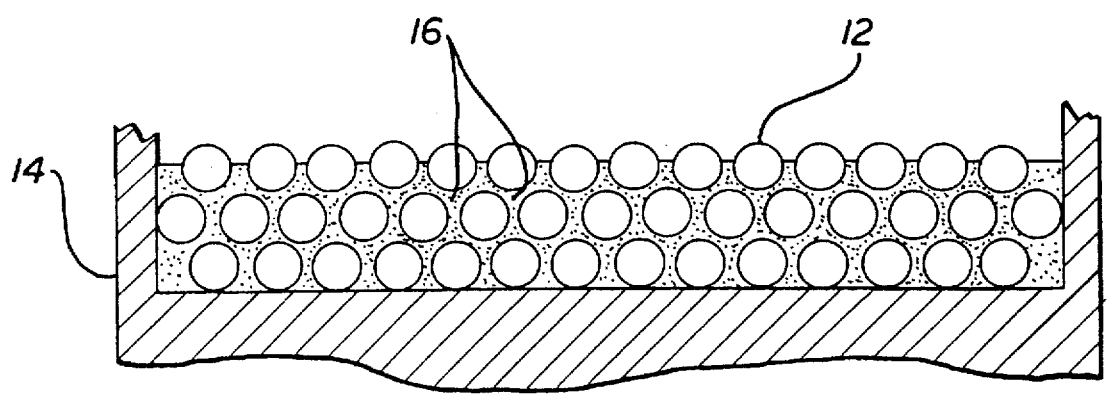
FIG. 2 is an enlarged cross-sectional view of a representative portion of the layered windings of a sensor coil in accordance with the invention.

FIG. 2 is an enlarged cross-sectional view of a representative portion of the layered windings of optical fiber 12. As can be seen, the windings of optical fiber 12 are potted within a matrix of adhesive material 16. Generally, the presence of such adhesive material 16 provides a number of useful advantages for the gyro. These include facilitating the precision of coil winding. That is, the adhesive potting material 16 can be applied and cured layer-by-layer so that smooth surfaces will be presented for the winding of subsequent layers. Such a winding environment enhances control of the resulting coil geometry including such essential factors as inter-fiber spacing, turns per layer and layers per coil and minimizes winding defects such as "missing turns".

Various manufacturing methods can be employed to create a coil in which the turns or windings are embedded in a matrix of adhesive potting material. Such methods include, for example, application of the adhesive by means of a syringe-type dispenser followed by curing. Such methods assure that smooth surfaces will be presented for the winding of subsequent layers. A uv-curable adhesive which permits rapid hardening is most appropriate for such methods.

Other methods of manufacture include dry coil winding followed by vacuum impregnation with a very low viscosity adhesive. An alternative wet winding technique employs a thermally-curable adhesive that is applied as the coil is wound. The adhesive is left uncured (in liquid form) during winding. The completed (wound) coil is then thermally cured.

While coil potting provides numerous benefits, the selection of the potting material and its method of application can itself effect gyro performance significantly. In particular, through careful selection of the adhesive potting material 16, the sensitivity of the sensor coil 10 to vibration-induced bias errors and temperature effects can be significantly reduced.

The bias vibration sensivity of a sensor coil results from processes within the coil that introduce non-reciprocal phase error into the output that is indistinguishable from the rotation rate signal. Such sensitivity is caused by a non-reciprocal phase shift in the counterpropagating waves that, in turn, results from changes in fiber length and refractive index brought about by vibration dynamic strains. This bias error is similar in nature to the Shupe bias error described earlier, the main difference being that the environmental perturbation is vibratory strain rather than changing temperature.

The inventors have experimentally observed that, when resonance frequencies are greatly removed from the instrument performance bandwidth (and the noise factor is negligible), the open loop response of the gyroscope to a sinusoidal vibration sweep is a linear function of vibration frequency. This is true when the direction of vibration is either parallel to the coil input axis (axial vibration) or perpendicular to it (transverse vibration). That is, the fiber optic gyro bias vibration sensitivity is a linear function of vibration frequency, a result that has been predicted by the bias vibration sensitivity model developed by the inventors. Furthermore, under transverse vibration, the gyro output exhibits an azimuthal dependence that is nearly sinusoidal, (i.e., varies as the SIN of the azimuth angle.)

The consequences of this vibration sensitivity are significant. Even though a direct D.C. bias effect, called "D.C. rectification" has not been observed, vibration-induced saturation of the electronic components can prevent the closed-loop electronics from monitoring the rotation rate at certain vibration frequencies. This can be manifested as an apparent D.C. rectification. Angle rate noise may also result from the vibration as well as pseudo-coning at the system level.

The above-described vibration-associated problems may be minimized or eliminated by arranging the matrix comprising potting adhesive and fiber windings so that the vibration dynamic stresses experienced in the fiber windings are minimized. High stresses and strains in the fiber core are produced by dynamic amplification. This harmful dynamic amplification effect can be traced to the use of an adhesive potting material of insufficient elastic stiffness. However, the use of a very high Young's modulus potting material is tempered or limited to some degree by certain temperature-related effects that accompany too much stiffening of the potting material. Among those effects are coil cracking, h-parameter (polarization cross-coupling) degradation if the coil is of PM-fiber composition, and large bias temperature-ramp sensitivity. Adequate solutions have been found to the problem of vibration-induced bias by potting sensor coils in various polymers, highly desirable due to their adhesive and encapsulating properties. However, it is found that, when potting coils in certain polymers, gyros exhibit other significant bias errors that appear to be unrelated to vibration. Most significantly, the inventors have found that the disturbing phenomena of bias spiking and/or bias crossing regularly occur in gyros employing such polymers for coil potting material as the UV-curable acrylate-adhesive marketed as NORLAND 65. Such anomalies appear when the sensor coil is cycled over the range of operating temperatures.

Figure 3:
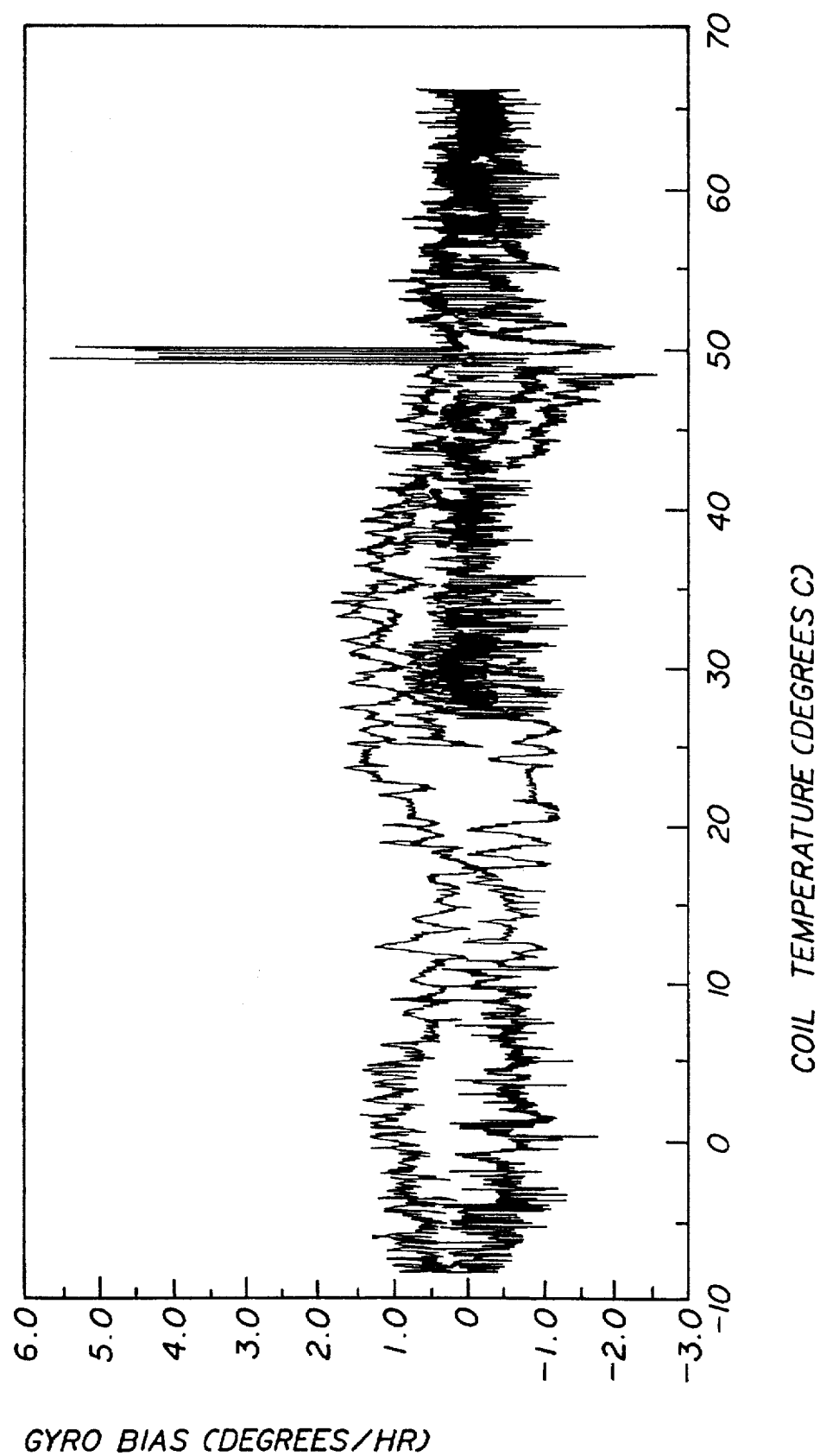
FIGS. 3 and 4 are graphs that illustrate bias as a function of temperature for a gyro including a sensor coil potted in NORLAND 65 UV-curable acrylate-adhesive.

FIG. 3 is a graph of the relationship of bias error (degrees per hour) to coil temperature (over a range of approximately −10 degrees Centigrade to 70 degrees Centigrade) for a gyro including a sensor coil potted with NORLAND 65 acrylate-adhesive. The coil tested comprised 200 meters of 165 micron fiber manufactured by the Corning corporation. It was wound upon a mandrel of carbon composite material in a twenty (20) layer configuration.

The coil temperature was ramped both up down. The data as plotted was corrected for both the linear relationship between gyro output and temperature and for temperature-rate dependence. The remaining residual bias is characterized by a standard deviation of 0.62 degree per hour as the coil temperature was cycled between −10 degrees Centigrade and 70 degrees Centigrade. As can be seen, an abrupt and extreme departure of the data (a bias spike) occurs around 50 degrees Centigrade. The illustrated bias spike exceeds 5 degrees per hour.

Figure 4:
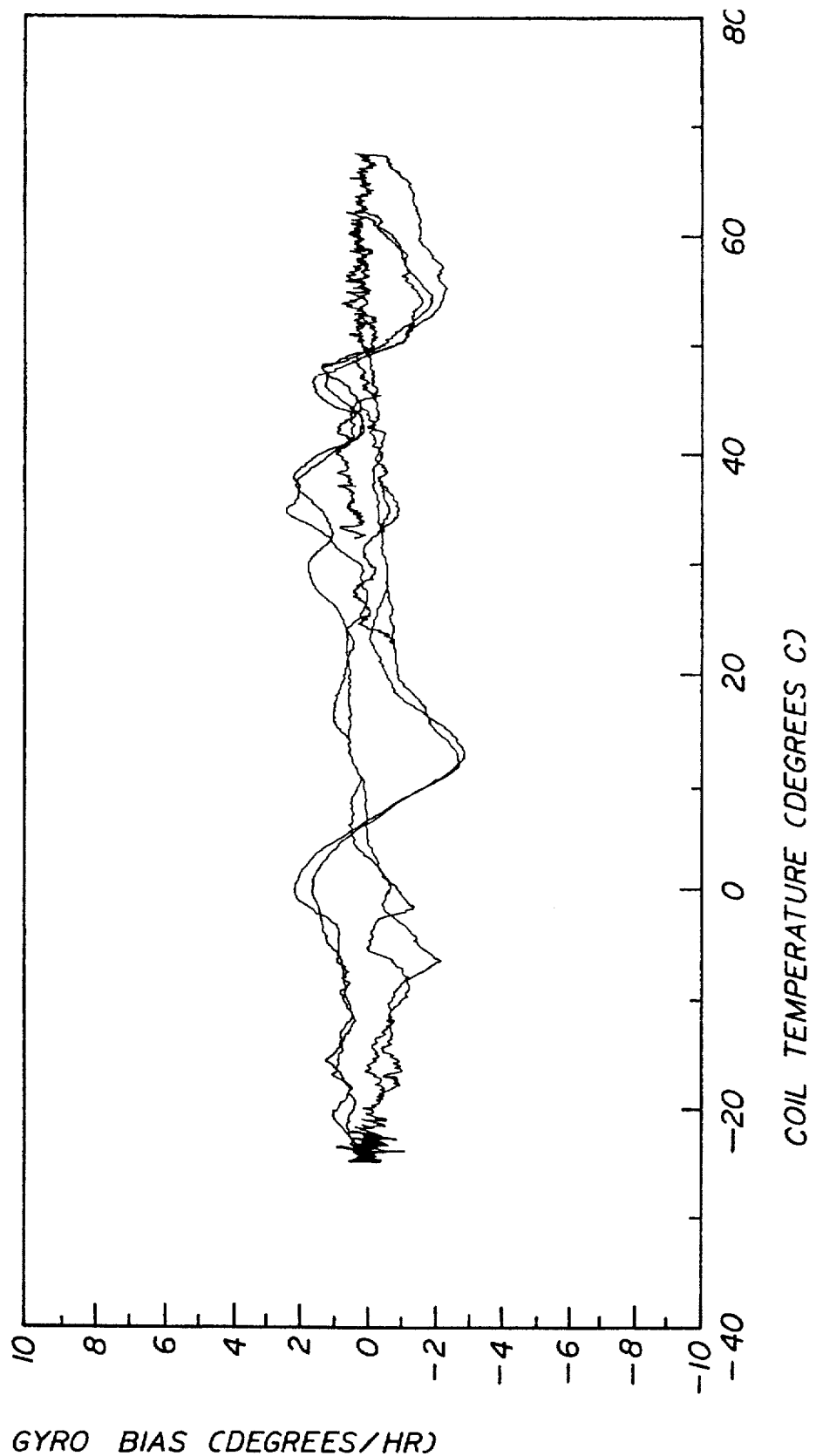

FIG. 4 is a similar graph of data obtained from another sensor coil potted in NORLAND 65 that was cycled between approximately −25 degrees Centigrade and 70 degrees Centigrade. The data from this coil demonstrates the phenomenon of bias crossing. The standard deviation was obtained of 0.61 with peak-to-peak bias excursions exceeding 4 degrees per hour. The plots of data obtained from different directions of temperature ramping cross each other at two points corresponding to approximately 5 and 50 degrees Centigrade. Such crossings indicate that the bias dependence on temperature rate of change (or Shupe coefficient) is also temperature dependent. Such dependency introduces extreme complications into the analysis of bias that, in turn, makes the modelling thereof, and the modelling of bias errors out of the gyro output signal, impracticable.

The inventors have related the above-illustrated-phenomena to the physical behavior of the polymer employed as the potting material. Every polymer is characterized by its so-called glass transition region, a temperature range over which a significant change in the Young's modulus of the material is observed. This region witnesses the transition from a glassy state to a rubbery state as the temperature is increased. A polymer can exhibit a change in stiffness from greater than 150,000 p.s.i. to less than 400 p.s.i. over its glass transition region.

Figure 5:
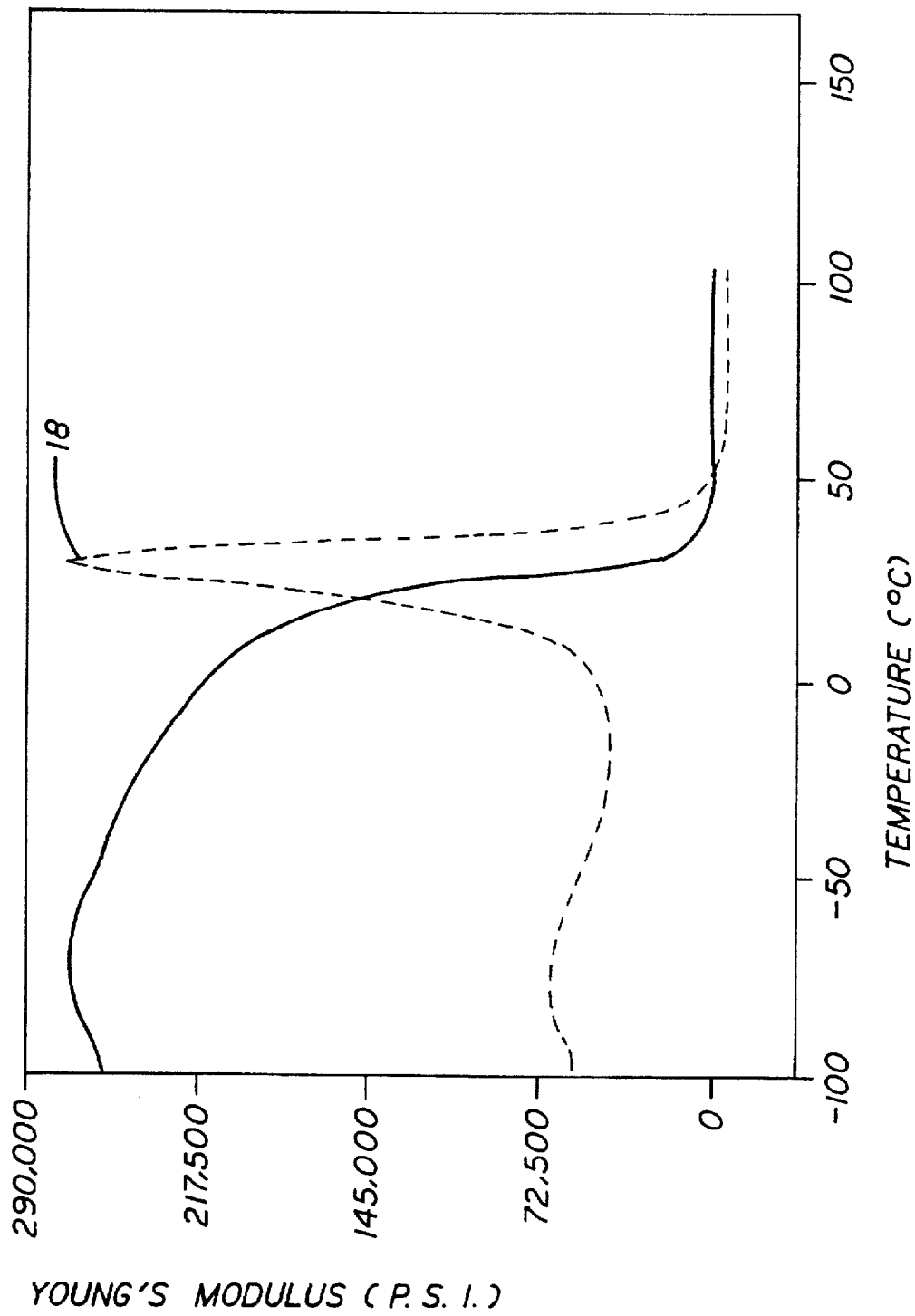
FIG. 5 is graph of the Young's modulus of cured NORLAND 65 acrylate-adhesive as a function of temperature.

FIG. 5 is a graph of the relationship between temperature and Young's modulus for cured NORLAND 65 as its temperature is raised from −100 degrees Centigrade to 100 degrees Centigrade. As can be seen, an abrupt decrease in the Young's modulus of the material begins as this acrylate-adhesive is cooled to approximately zero degrees Centigrade and such transition is completed at approximately 50 degrees Centigrade. This corresponds to the physical transition of the polymer from a glassy state to a rubbery state. The center of the transition region coincides approximately with the peak 18 of the graph of the imaginary part of the modulus, which takes place at 28 degrees Centigrade. The Young's modulus of NORLAND 65 changes from approximately 220,000 p.s.i. to approximately 400 p.s.i., a 500 times reduction in stiffness, over the transition region.

The inventors have noted that the harmful phenomena of bias spiking and bias crossing take place at temperatures within or close to the glass transition region of this potting material. In fact, they have found that both "bias spiking" and "bias crossing" take place close to the two "edges" of the transition region, namely, around zero degrees Centigrade, and around 50 degrees Centigrade. This has led them to deduce a correlation between the temperature-dependence of the bias phenomena and the glass transition region behavior of the polymer potting material, and to base new potting materials thereon.

Accordingly, they have sought polymer-based potting materials for a sensor coil characterized by both (1) a glass transition temperature that lies outside the operational range of the gyro and (2) a sufficiently large modulus of elasticity (based upon the coil form factor and predicted vibration resonances) to effectively reduce the bias vibration sensitivity to acceptable levels.

Generally, commercial applications specify an operational range of –40 degrees Centigrade to 60 degrees Centigrade while military specifications require operation over the region –55 degrees Centigrade to 105 degrees Centigrade. It is, of course, noted that the glass transition temperature and, consequently, the harmful bias spikes and bias crossings of NORLAND 65 potted sensor coils unfortunately fall well within both military and commercial operating temperature specifications.

The inventors have developed polymer-based potting materials that do not subject the potted coil and gyro to errors of the type experienced with NORLAND 65 or like polymers. This has been accomplished in two ways. First, the coil is potted in a polymer adhesive whose glass transition region is outside the operational temperature range of the gyro sensor coil. Secondly, in recognition of the dependence of vibration-induced bias upon stiffness, appropriate "fillers" may be added to the polymer for the purpose of stiffening it in the rubbery region so that the requisite Young's modulus is achieved.

In particular the inventors have found silicones to provide good candidate materials. Their glass transition temperatures lie below –55 degrees Centigrade and thus outside both commercial and military specifications. While such materials are therefore satisfactory for assuring that a significant change in the Young's modulus of the material, resulting in a bias spike or bias crossing, will not occur during normal gyro operation, the Young's modulus of such material in the temperature region exceeding (more positive than) the glass transition region possesses a significantly lower modulus than below the transition region. This is, of course, the case for all polymers. For example, in FIG. 5 it can be noted that the Young's modulus is very stable when the transition temperature is exceeded although at a significantly reduced stiffness that may not be large enough to provide desired resistance to vibration-induced bias. Similarly, FIG. 6(a) shows that the Young's modulus of a silicone material is only about 370 p.s.i. and, thus, not stiff enough for a gyroscope required to operate in stringent vibration environments.

The inventors have found that certain "fillers" of varying material composition can be added to silicone to enhance material performance with regard to vibration-induced bias. The addition of such fillers thus permits one to obtain the desired vibration resistance despite the relatively-low Young's modulus of the "bare" silicone material when the glass transition temperature is exceeded. In effect, the addition of the filler material increases the stiffness of the silicone in the rubbery region to reduce the gyro vibration sensitivity to the desired level.

Among the filler materials that produce potted sensor coils with excellent bias characteristics is carbon black. This material is known to react chemically with rubber in such a way as to increase the tensile strength and modulus of such material. Accordingly, carbon black is known as a reinforcing filler of rubber. The inventors have found that the reinforcing properties of carbon black are applicable to the diverse problems discussed above. Carbon black also increases the cohesive strength of a silicone composition, so that a coil potted with silicone including carbon-black filler is more resistant to thermally-induced cracking and delamination due to cohesive failure. When different fillers are added to the bare silicone, attention must be taken to a possible degradation of the adhesion or bonding strength. It has been found that "baking" the fiber at 75 degrees Centigrade or above improves the bonding strength between the fiber and the potting material. Other satisfactory fillers for silicone potting materials uncovered by the inventors include glass particles, quartz, silicon carbide, graphite and alumina (aluminum oxide) powder.

Figure 6A:
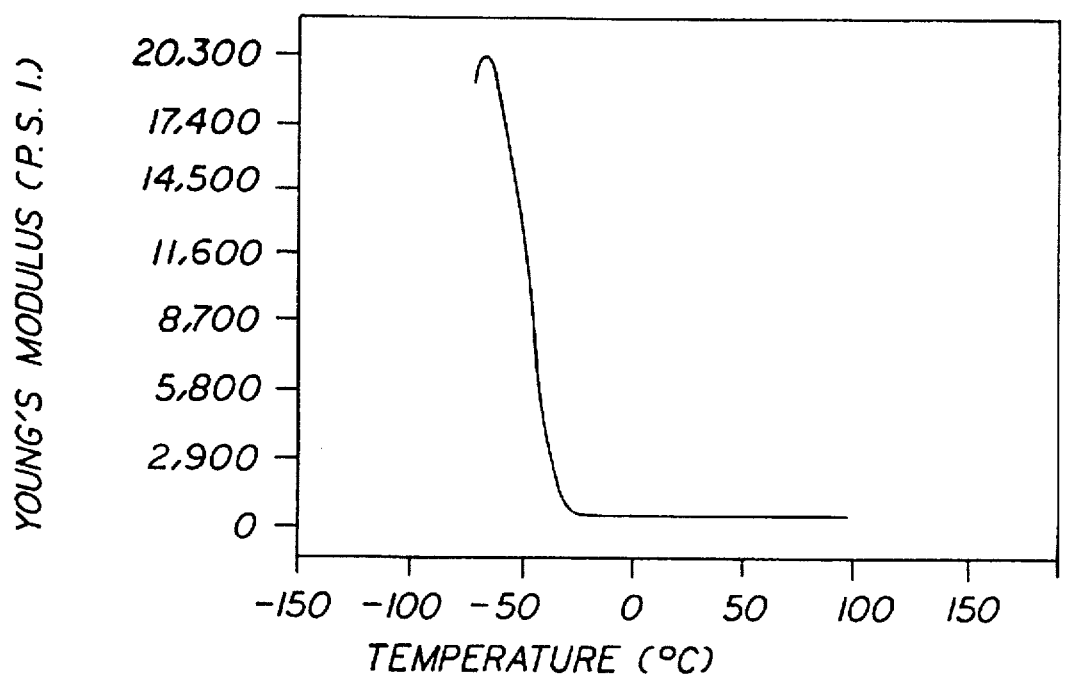
FIGS. 6(a) and 6(b) are graphs of the Young's modulus of a silicone composition without and with carbon-black filler material, respectively as a function of temperature.
Figure 6B:
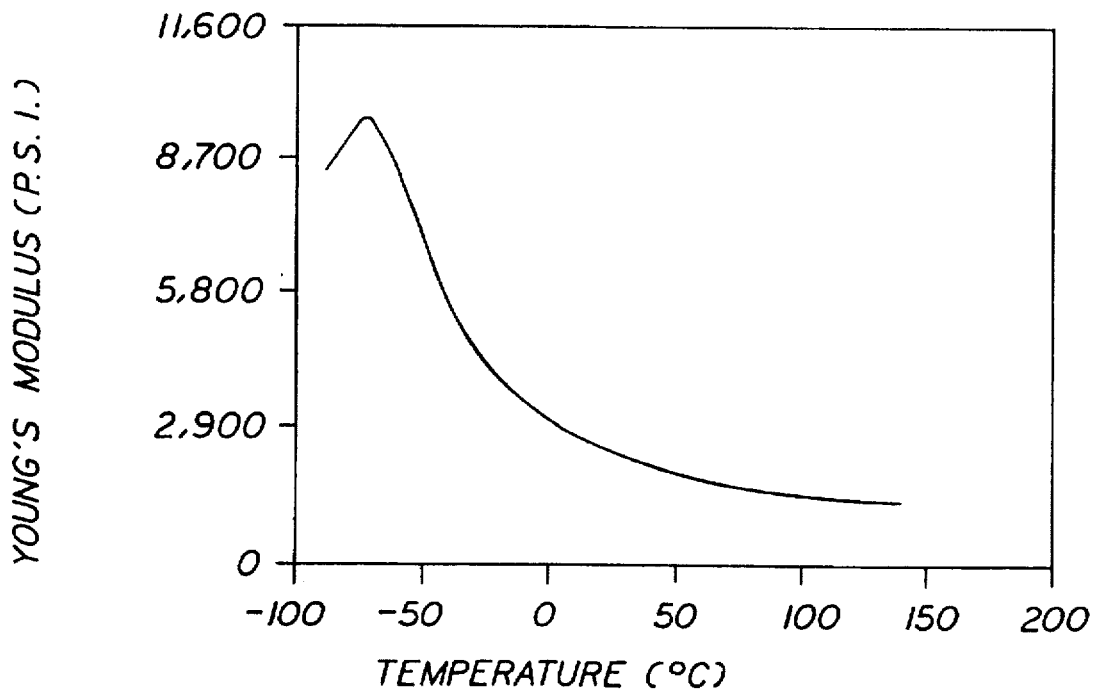

FIG. 6(a) is a graph of the Young's modulus versus temperature for the silicone composition of Master Bond, Inc. of Hackensack, N.J. marketed under the commercial designation "Mastersyl 151". FIG. 6(b) is a graph of the Young's modulus vs. temperature of the same silicone material, filled with carbon-black. The carbon black filler material employed was THERMAX Medium Thermal Black N-991 which is marketed by Cancarb Limited of Medicine Hat, Alberta, Canada. As can be seen in FIG. 6(a) the glass transition of the silicone material is centered about –66 degrees Centigrade with the stiffness of the material abruptly decreasing, as the temperature is increased above the glass transition region, to approximately 370 p.s.i. This behavior is to be contrasted with the carbon black filled silicone material of FIG. 6(b) whose glass transition region is centered at –72 degrees Centigrade, again well below the gyro operational range. A more gradual decrease in the Young's modulus of the material is seen to occur as the filled material is heated above the glass transition region. In contrast to the silicone material lacking filler material, the sample of FIG. 6(b) approaches Young's modulus stability at a value of approximately 1,500 p.s.i. within the rubbery region. Thus, the experimental data confirms the utility of the particular filler, carbon black, as a stiffener of the silicone material when heated above its glass transition temperature.

Figure 7:
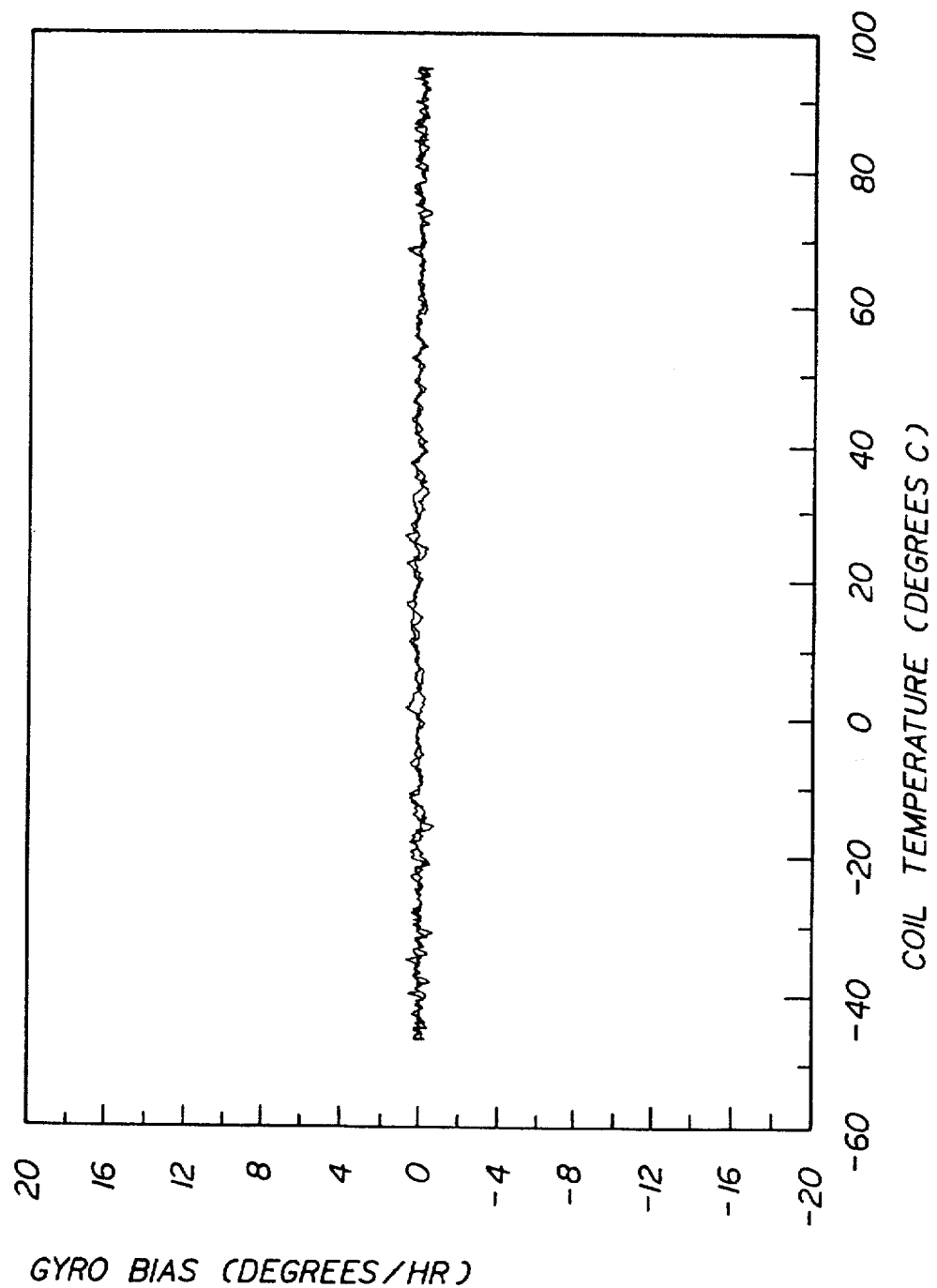
FIG. 7 is a graph of bias error as a function of temperature for a gyro including a sensor coil potted in a silicone composition with carbon-black filler.

The inventors have applied the observed desirable properties of silicone and silicone-filled potting materials to the fabrication of gyro sensor coils and have realized outstanding results in terms of improved performance. FIG. 7 is a graph of bias error as a function of temperature for a gyro including a sensor coil potted in the carbon black-stiffened silicone composition of FIG. 6(b). The bias data was obtained from a forty (40) layer wound sensor coil formed of 200 meters of 165 micron optical fiber made by Corning Corporation. As in the case of the data plotted in the graphs of FIGS. 3 and 4, the data of FIG. 7 is corrected for both the linear relationship between gyro output and temperature and for temperature rate dependence. The remaining residual bias is seen to be negligible, possessing a standard deviation of 0.19 degrees per hour as the temperature of the sensor coil is cycled between –50 degrees and 95 degrees Centigrade. No bias spikes or bias crossings are present in the data of FIG. 7. The contrast between the data of FIG. 7 and that of FIGS. 3 and 4 is dramatic and confirms the inventors' insights and suppositions with regard to the nature of the problems associated with the potting of sensor coils in polymers.

Figure 8:
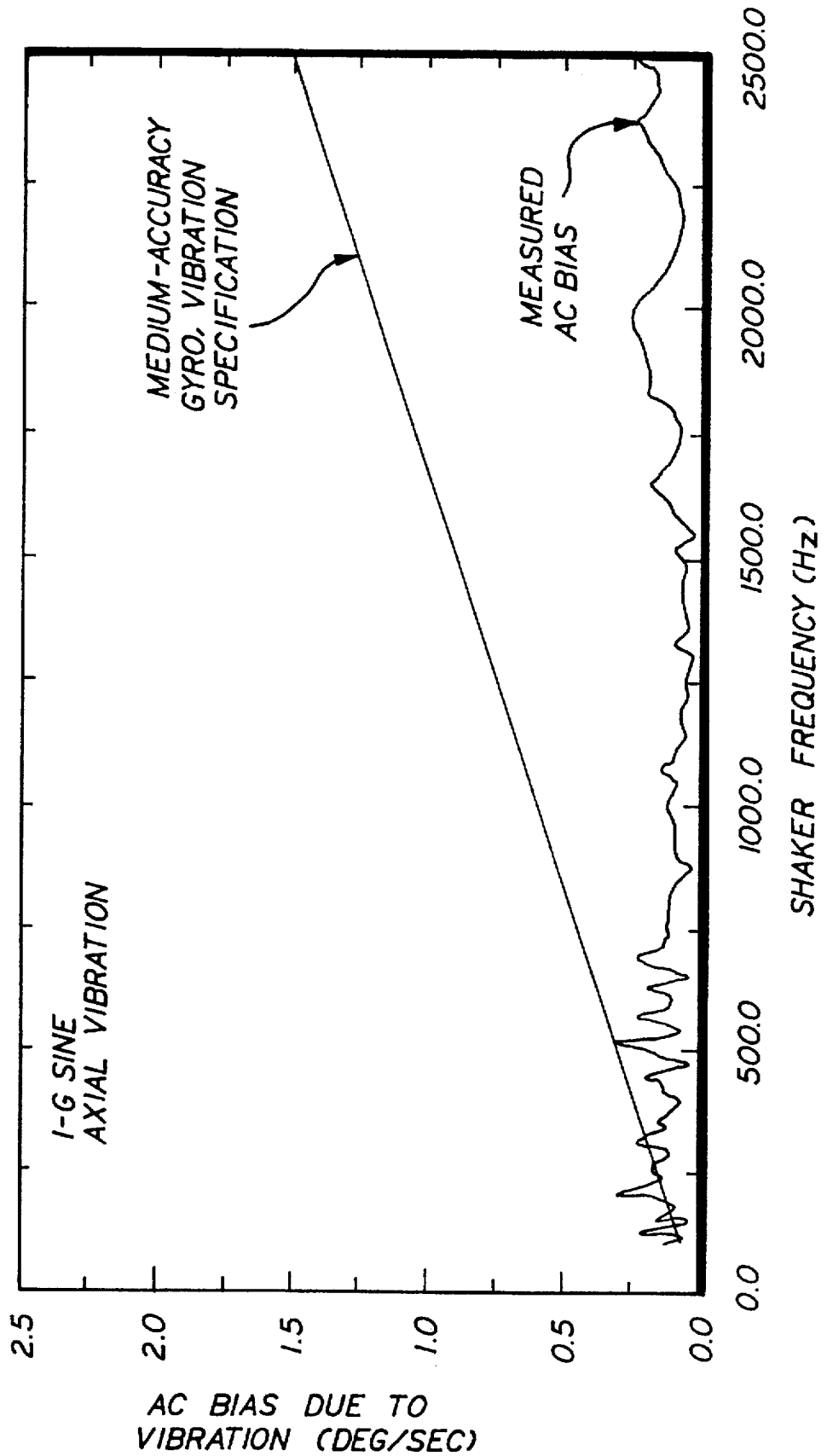
FIG. 8 is a graph of the A.C. bias due to vibration versus shaker frequency for a coil potted in carbon-black filled silicone.

FIG. 8 is a graph of the AC bias due to sinusoidal vibration versus shaker frequency for a coil potted in carbon-black filled silicone. This bias data was also obtained from a 40 layer wound coil formed of 200 meters of 165 micron optical fiber made by Corning corporation. As the graph shows, the AC bias output is substantially negligible in this measurement. The acceleration level was kept constant at one g.

Thus, it is seen that the teachings of the present invention provide sensor coils that are substantially improved in terms of minimization of bias sensitivities due to dynamic thermal and vibration environments. By utilizing the teachings of the invention, one can obtain gyro performance that is substantially less subject to bias errors of environmental origin that were formerly unrecognized or unaddressed by the prior art.

While this invention has been described with reference to its presently preferred embodiment, it is not limited thereto. Rather, this invention is limited only insofar as defined by the following set of patent claims and includes within its scope all equivalents thereof.

What is claimed is:

1. A sensor coil for a fiber optic gyroscope of the type that is characterized by a predetermined operating temperature range between a lower temperature limit and an upper temperature limit, said coil comprising in combination;

(a) an optical fiber;
   (b) said fiber being arranged into a plurality of concentric cylindrical layers;
   (c) each of said layers comprising a plurality of turns of said fiber;
   (d) each of said turns being arranged into a predetermined winding pattern;
   (e) each of said turns being encapsulated with potting material comprising a preselected polymer having a glass transition temperature that is less than said lower temperature limit; and
   (f) said potting material including a filler material selected from the group consisting of carbon black, glass particles, quartz, silicon carbide, graphite and aluminum oxide powder.

2. A method for fabricating a gyro sensor coil that is substantially free of the effects of bias spiking and bias crossing over a predetermined temperature range defined by a lower temperature limit and an upper temperature limit, said method comprising the steps of:

a) selecting a continuous optical fiber; and
   b) selecting a silicone for potting said coil by (i) comparing the glass transition temperature of at least one candidate silicone with said predetermined temperature range and then (ii) choosing a silicone whose glass transition temperature is less than said lower temperature limit; then
   c) adding a filler material to said silicone selected from the group consisting of carbon black, glass particles, quartz, silicon carbide, graphite and aluminum oxide powder; then
   d) winding said optical fiber into a coil in accordance with a predetermined winding pattern; and
   e) encapsulating said wound coil with said selected silicone.

3. A method as defined in claim 2 further including the step of baking said potted coil at 75 degrees Centigrade.

* * * * *